United States Patent
Dumitru et al.

(10) Patent No.: US 7,650,332 B2
(45) Date of Patent: Jan. 19, 2010

(54) DATABASE QUERY TOOLS

(75) Inventors: Marius Dumitru, Issaquah, WA (US); Amir Netz, Bellevue, WA (US); Mosha Pasumansky, Redmond, WA (US); Cristian Petculescu, Redmond, WA (US); Richard R. Tkachuk, Sammamish, WA (US); Alexander Berger, Sammamish, WA (US); Irina G. Gorbach, Bellevue, WA (US); Grzegorz Guzik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 492 days.

(21) Appl. No.: 11/069,263

(22) Filed: Mar. 1, 2005

(65) Prior Publication Data

US 2006/0007731 A1  Jan. 12, 2006

Related U.S. Application Data

(60) Provisional application No. 60/586,617, filed on Jul. 9, 2004.

(51) Int. Cl.
*G06F 7/00* (2006.01)
*G06F 17/30* (2006.01)
(52) U.S. Cl. .................................. 707/3; 707/100
(58) Field of Classification Search ............... 707/1–6
See application file for complete search history.

(56) References Cited

U.S. PATENT DOCUMENTS

| 6,609,123 | B1 | 8/2003 | Cazemier et al. |
| 6,651,055 | B1 | 11/2003 | Kilmer et al. |
| 2003/0101176 | A1 | 5/2003 | Kelkar |
| 2003/0115194 | A1* | 6/2003 | Pitts et al. ..................... 707/3 |
| 2004/0215626 | A1* | 10/2004 | Colossi et al. ............... 707/100 |
| 2005/0010565 | A1* | 1/2005 | Cushing et al. ................ 707/3 |
| 2005/0120051 | A1 | 6/2005 | Danner et al. |
| 2005/0149550 | A1* | 7/2005 | Berger et al. ................ 707/102 |

OTHER PUBLICATIONS

"Analysis Services", Microsoft Corp., 2005, Last accessed Jul. 26, 2005, http://msdn.microsoft.com/library/default.asp?url=/library/en-us/olapdmad/aggettingstart_80xj.asp.

* cited by examiner

*Primary Examiner*—Pierre M Vital
*Assistant Examiner*—Loan T Nguyen
(74) *Attorney, Agent, or Firm*—Workman Nydegger

(57) ABSTRACT

A system that facilitates one or more of querying and updating a multi-dimensional structure comprises a component that receives a statement in a declarative language relating to a typed object associated with a multi-dimensional structure. A conversion component analyzes context associated with the statement and automatically converts the object to a disparate type as a function of the analysis. For example, an execution engine can comprise the conversion component, and the execution engine can be an Online Analytical Processing (OLAP) engine.

15 Claims, 13 Drawing Sheets

DATABASE QUERY TOOLS

REFERENCE TO RELATED APPLICATIONS

This application claims the benefit of U.S. Provisional Application Ser. No. 60/586,617 filed on Jul. 9, 2004, and entitled SYSTEMS AND METHODS OF FACILITATING USAGE OF DATABASES. This application is also related to Ser. No. 11/069,693, entitled SYSTEM THAT FACILITATES DATABASE QUERYING, and Ser. No. 11/069,314, entitled RELATIONAL REPORTING SYSTEM AND METHODOLOGY, both filed on Mar. 1, 2005. The entireties of these applications are incorporated herein by reference.

TECHNICAL FIELD

The subject invention relates generally to multi-dimensional data, and more particularly to updating/structuring multi-dimensional data by way of simplified statements within a declarative language.

BACKGROUND OF THE INVENTION

The evolution of computers with respect to memory storage expansion and processing capabilities has enabled massive amounts of data to be accumulated and analyzed by complex and intelligent algorithms. For instance, given an accumulation of data, algorithms can analyze such data and locate patterns therein. These patterns can then be extrapolated from the data, persisted as content of data mining model(s), and applied within a desired context. With the evolution of computers from simple number-crunching machines to sophisticated devices, services can be provided that range from video/music presentation and customization to data trending and analysis.

Accordingly, tasks that at one time required skilled mathematicians to perform complex operations by hand can now be automated through utilization of computers. In a simplistic example, many individuals, rather than utilizing a skilled accountant to compute their tax liability, simply enter a series of numbers into a computer application and are provided customized tax forms from such application. Furthermore, in a web-related application, the tax forms can be automatically delivered to a government processing service. Thus, by way of utilizing designed algorithms, data can be manipulated to produce a desired result.

As complexity between relationships in data increases, however, it becomes increasingly difficult to generate an output as desired by a user. For instance, multiple relationships can exist between data, and there can be a significant number of manners by which to review and analyze such data. To obtain a desired output from the data, one must have substantial knowledge of content and structure of such data and thereafter generate a complex query to receive this data in a desired manner. Furthermore, if the data must be manipulated to obtain a desirable output, the user must have an ability to generate algorithms necessary to make the required manipulations or outsource the task to a skilled professional. Thus, expert computer programmers and/or data analyzers are typically needed to properly query a database and apply algorithms to results of these queries. Moreover, if data and/or relationships therebetween are significantly altered, the expert programmers and/or data analyzers may have to reconfigure a database query and algorithms to manipulate data returned therefrom. Furthermore, if a user or entity desires a disparate output (e.g., desires to modify data analyzed and/or modify data output), then the expert must be summoned yet again to make necessary modifications. Due to complexity and number of relationships between data, these tasks can require a substantial amount of time, even with respect to one of utmost skill. Accordingly, cost, both in monetary terms and in terms of time, can become significant to a user and/or entity, particularly in a business setting, where data must be analyzed and manipulated to create a desired output.

Conventional systems and methodologies for altering data and extracting data from multi-dimensional structures often require use of relatively lengthy statements, where each type of object analyzed needs to be precisely specified. Accordingly, a user must have substantial knowledge of structure of the multi-dimensional structure. Furthermore, the length of the statements provides opportunities for users to incorrectly enter such statements, resulting in user frustration. Another deficiency associated with conventional systems relates to aggregating data with respect to a plurality of sets. Due to possible difficulties with such aggregation, conventional systems/methodologies do not enable users to aggregate data over multiple sets.

Accordingly, there exists a need in the art for a system and/or methodology that provides additional functionality with respect to database systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to various systems and methodologies that simplify and enhance current tools for querying and/or updating multi-dimensional structures, such as data cubes, dimensions associated with data cubes, attribute hierarchies, attributes, members, and the like. For example, the subject invention provides systems/methodologies that allow for an object type to be converted to a disparate object type as a function of context. Specifically, a function can be expected to return and/or operate on an object of a particular type, such as a hierarchy, a set, a level, a member, a scalar, a tuple, and the like. An aspect of the subject invention does not force a user to specify a type of object that is to be associated with the function—rather, the object type can be automatically determined as a function of context. In one example, a function can be analyzed and object types associated therewith can be automatically determined (e.g., by way of a table). In another example, an object selected can be analyzed to determine what conversions are associated with the object type. As a function of the determined context, a type conversion can be implicitly undertaken. Such functionality can substantially shorten statements associated with a multi-dimensional structure, thereby lessening opportunity for user error.

The subject invention also provides for consistent output with respect to members within a multi-dimensional structure that are subject to change. For example, as data associated with the multi-dimensional structure is subject to change, members associated therewith can become unresolvable in one instance and resolvable in another. Accordingly, as a user requests data associated with these changing members, such user can be provided with inconsistent results. One aspect of the subject invention enables a user to specify a manner in which these changing members can be output, and these members can then be output according to the user specification.

In accordance with another aspect of the subject invention, an execution engine can resolve arguments at execution time rather than at a time such arguments are parsed. For example, the execution engine can be an Online Analytical Processing (OLAP) engine. Resolving arguments at execution time enables a number of functions to be decreased within a declarative language (such as Multidimensional Extensions (MDX)), as various permutations of object type can exist within a single function (e.g., a function does not have to exist for each permutation of type associated with an argument).

In accordance with yet another aspect of the subject invention, statements requesting output associated with unrelated dimensions can be returned to a user in a consistent manner as specified by a user. For example, a multi-dimensional structure can include a dimension associated with sales, inventory, time, and customer, and values can be obtained by measuring dimensions against one another. For instance, sales can be measured against time, inventory can be measured against time, sales can be measured against customers, and so on. Some dimensions, however, are not sufficiently related to measure against one another. For instance, there is little relation between inventory and customer dimensions (e.g., it is nonsensical to measure inventory against a particular customer). In accordance with one aspect of the subject invention, one of the dimensions can be ignored. For example, total inventory can be provided to a requesting user (rather than inventory against a customer). Similarly, a user-specified value can be provided to the user.

One or more aspects of the subject invention further enables data within disparate sets to be aggregated by way of specifying sets in a declarative statement. For instance, one may wish to review sales in two disparate countries (which can relate to two disparate sets within a multi-dimensional structure). Conventionally, this requires two different statements. In accordance with the subject invention, these two sets can be specified in a singular statement, and data relating to the sets can be automatically aggregated and returned to a user. The aforementioned example is relatively simplistic—however, other, more complex data aggregations can be completed by way of the subject invention. For instance, a set can include a semantically stored calculation, and results of such calculation can be aggregated over the set. The results of such aggregation can then in turn be aggregated with a disparate set. Any suitable mechanisms to aggregate data or calculations associated with multiple sets is contemplated by the inventors of this invention and intended to fall under the scope of the hereto-appended claims.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
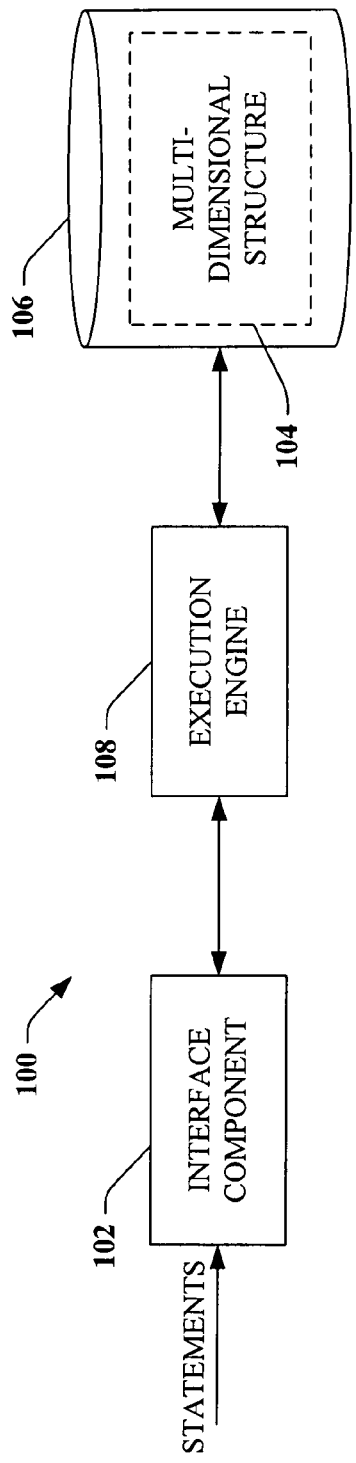
FIG. 1 is a high-level block diagram of a system that facilitates updating/maintaining a multi-dimensional object in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one or more aspects of the subject invention. The subject invention relates to a system 100 that facilitates receiving and interpreting statements relating to querying, updating, and/or maintaining a multi-dimensional structure. The system 100 includes an interface component 102 that is utilized to receive and/or solicit statements/commands from a user or other suitable computer component. The user interface component 102 can be, for example, a graphical user interface (GUI), a keyboard, a pressure-sensitive screen, a pointing and clicking device, a combination of one or more of the aforementioned devices, and the like. In accordance with one aspect of the subject invention, the statements received/obtained by the interface component 102 can be written in a declarative language. For instance, the language can be a SQL-based language, such as Multidimensional Expressions (MDX). In particular, MDX is a language that is utilized to unlock capabilities of multi-dimensional data structures, such as Online Analytical Processing (OLAP) database structures. Other suitable declarative languages and database structures, however, are contemplated by the inventors of the subject invention and intended to fall under the scope of the hereto-appended claims.

The statements received by the interface component 102 can relate to various novel aspects associated with the subject invention. For example, the statements can relate to a particular object type within a multi-dimensional structure 104, wherein such structure 104 exists within a data store 106. The multi-dimensional structure can be, for instance, a data cube, a dimension associated with a data cube and/or a sourceless dimension, an attribute hierarchy, an attribute, or the like. In particular, the statements can relate to any suitable object, such as a hierarchy, a level of a hierarchy, a described set, a member, a tuple, a scalar, and other suitable object types. In conventional systems/methodologies, such statements required explicit definitions of objects in order to return an appropriate type of object to a user. In accordance with an aspect of the subject invention, desirable object types can be automatically returned to a user as a function of an analyzed context. For instance, given a particular condition, a specific type of object can be returned to a user—given a different condition, a different object type can be returned to a user. Such automatic object typing simplifies utilization of a declarative language employed by users who wish to query and/or modify the multi-dimensional structure 104.

In accordance with another aspect of the subject invention, the system 100 can analyze members within the multi-dimensional structure 104 and treat such members in a manner desired by a user. In particular, the interface component 102 can receive statements that cause analysis of one or more members within the multi-dimensional structure. For a simplistic example, a user can deliver statements to the interface component 102 to return all cities within a particular state that have a population of less than one hundred. In some instances, there will be no such cities, while during other instances of time there may be several cities with a population of less than one hundred. Conventionally, inconsistent results would be returned to a user as members altered—for instance, an error would be returned to a user if none of the aforementioned sized-cities existed, while a value would be returned if one or more cities existed. The subject invention in general, and the system 100 in particular, facilitates causing results to be consistent—for example, if no cities exist, then return a null value rather than an error (and thus a value is consistently returned to a user).

The system 100 can further be employed to perform bindings within the received statements after parsing of such statements. In particular, statements can be resolved by an execution engine 108 at execution time rather than when such statements were being parsed—accordingly, a number of functions needed to be known by a user can be decreased, as not as many functions are necessary as permutations of types each argument can possess. Thus, in many circumstances, a type of argument to be included within the statement is not a concern.

In accordance with yet another aspect of the subject invention, the system 100 can be utilized to analyze dimensions to determine whether sufficient relation exists between the dimensions to output a value where a first dimension is measured against a second dimension. If there is a lack of relation, then a user can specify how information is returned (e.g., whether a dimension is ignored, whether a pre-specified value is returned, or the like). For instance, dimensions of the multi-dimensional structure 104 can relate to customers, and several other dimensions can be measured against the dimension relating to customers. In particular, sales can be measured by customer. It makes little sense, however, to measure inventory by customer, as inventory and a particular customer are not sufficiently related. Conventionally, errors are returned and/or numbers are altered, thereby causing inconsistent behavior. The execution engine 108 can analyze dimensions and determine a level of relation between dimensions, and return data to a user as specified by such user. For instance, a user may wish to receive errors, may wish to receive inventory without relation to customer, or may wish to receive a null value. Thus, output of the system 100 can be customized by the user.

With reference to yet another aspect of the subject invention, the system 100 can be utilized to receive statements that specify a plurality of sets, wherein data can be aggregated according to such sets. The sets can include data, semantically stored calculations, and the like. In one particular example, a request can be made to obtain data relating to sales in sets associated with two disparate states (e.g., sales in New York and sales in California). The execution engine 108 can analyze such sets and aggregate data from those sets. In conventional systems, syntax and/or functionality relating to aggregating data from various sets is not possible.

Figure 2:
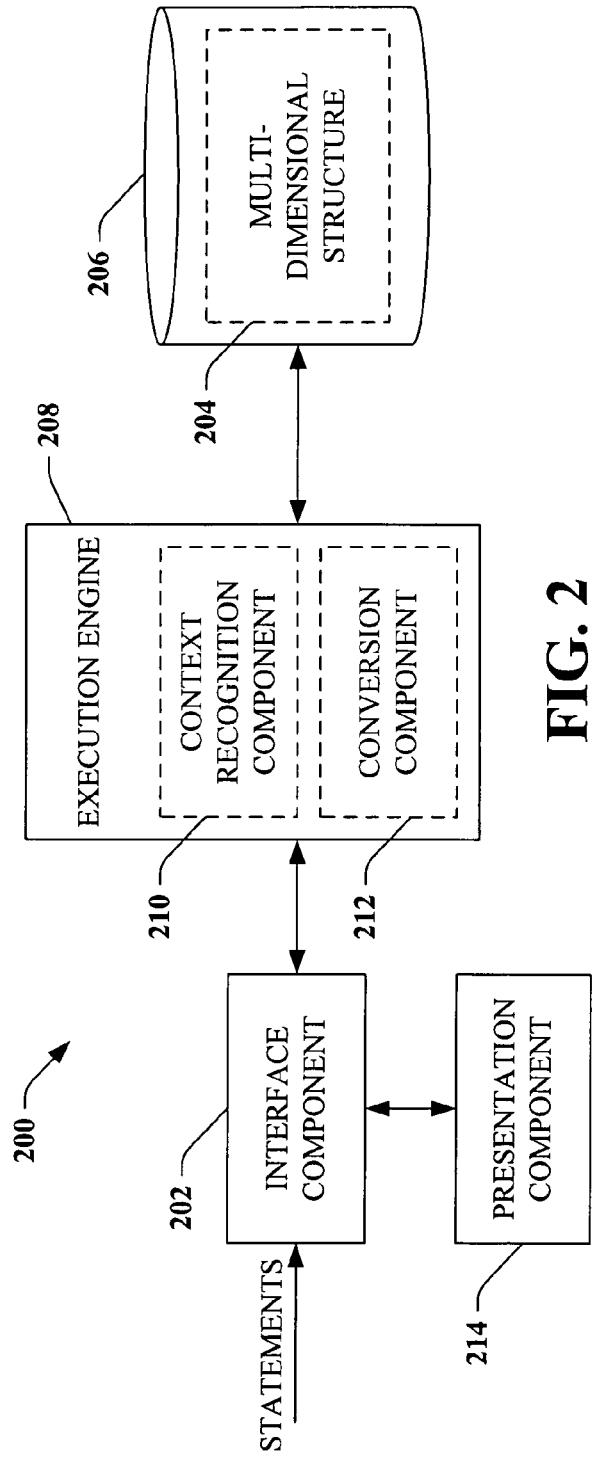
FIG. 2 is a block diagram of a system that facilitates automatically converting an object of a first type to a disparate type in accordance with an aspect of the subject invention.

Referring now to FIG. 2, a system 200 that facilitates automatically converting an object to an appropriate type is illustrated. The system 200 includes an interface component 202 that receives/solicits declarative statements from a user and/or computer-related entity. For instance, the statements can be associated with a request for data from a multi-dimensional structure 204 within a data store 206, wherein such data should be returned as a particular type (e.g., level, hierarchy, set, member, tuple, scalar, . . . ). An execution engine 208 receives the statements, and a context recognition component 210 analyzes the statements and determines a desired output that is associated with the statements. For instance, when a hierarchy object is utilized, it is expected that the hierarchy object will be associated with a member or set. The context recognition component 210 can review pre-defined rules associated with the object type to determine a type of conversion that is to be undertaken. Specifically, in each type conversion, an object is implicitly converted to a disparate type when the object is used in an expression within the received statements requiring such type.

Upon determining a type conversion that is to be undertaken, a conversion component 212 can effectuate such conversion. For instance, a number of pre-defined conversion rules can be utilized by the conversion component 212 to convert a first object type to a second object type. Specifically, a level of a hierarchy can be converted to a set, a hierarchy can be converted to a set or a member (depending upon context), a member can be converted to a tuple, a tuple can be converted to a member, a set, and/or a scalar, depending upon context. A table illustrating exemplary conversions that can be undertaken in MDX is provided below.

| Source | Destination | Conversion |
|---|---|---|
| Level | Set | <level>.members |
| Hierarchy | Set | <hierarchy>.members |
| Hierarchy | Member | <hierarchy>.defaultmember |
| Member | Tuple | (<Member>) |
| Tuple | Member | <tuple>.item(0) |
| Tuple | Scalar | <tuple>.value |
| Tuple | Set | {<tuple>} |

After the conversion has been undertaken by way of the conversion component 212, a presentation component 214 can be utilized to output results to a user. For instance, the presentation component 214 can be a graphical user interface (GUI), one or more speakers, a printer, or any other system/device that can be employed to output data to a user.

To aid in understanding of this aspect of the subject invention, an example function that may be associated with a type conversion is described herein. This example, however, is merely to provide context and is not intended to be limitative, as various functions can be associated with type conversions. A "Head" function can be utilized to return a finite number of members within a set—if the head function is utilized against a hierarchy, then such hierarchy can be converted to a set. Thereafter, a finite number of the set can be returned to the user. Similarly, a "Head" function can be enacted against a level of a hierarchy. The context recognition component 210 can determine that the "Head" function should be associated with a set (rather than a hierarchy), and can implicitly convert the hierarchy to a set as illustrated in the table above.

Figure 3:
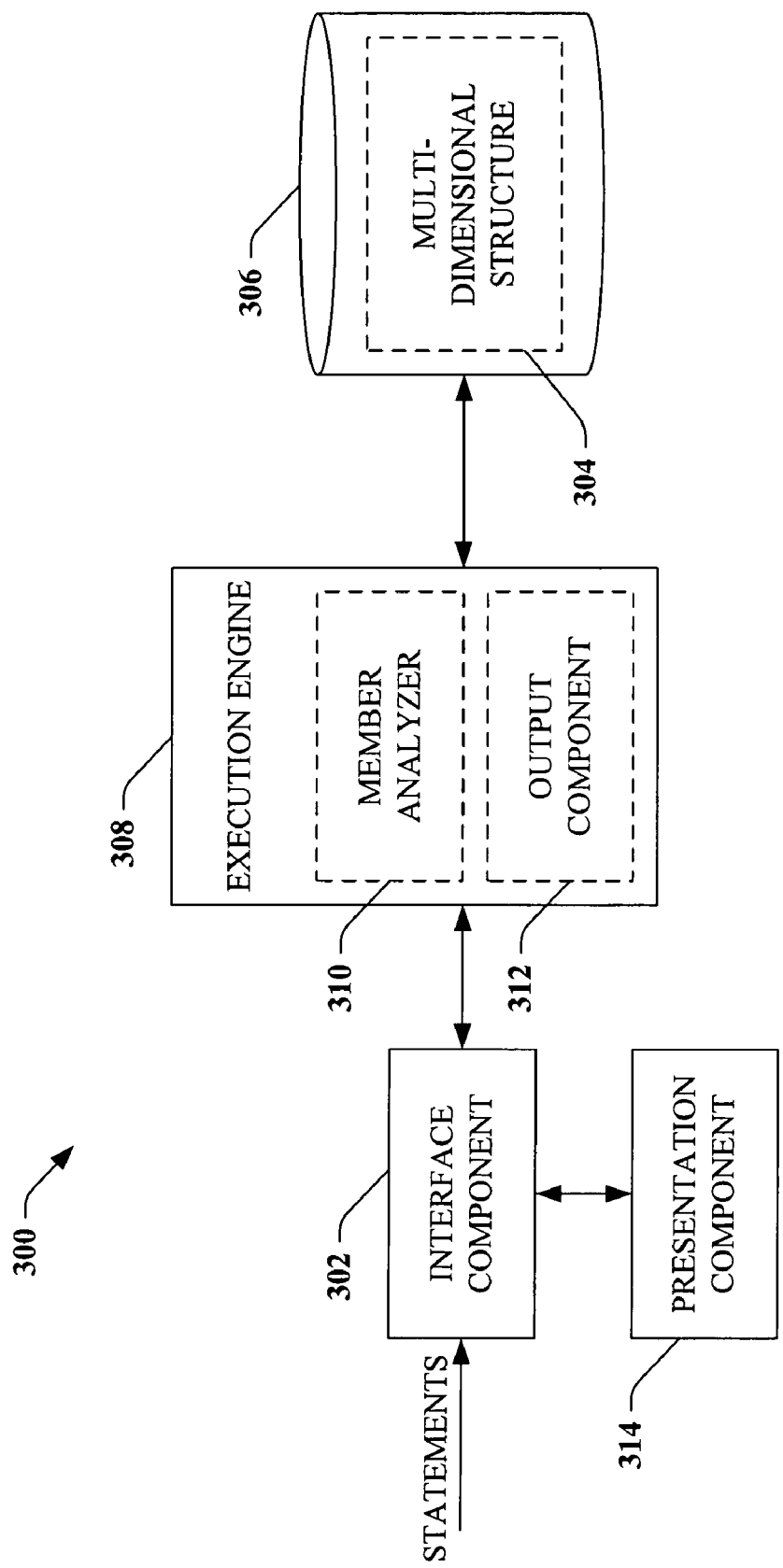
FIG. 3 is a block diagram of a system that facilitates analyzing and managing members subject to change within a multi-dimensional object in accordance with an aspect of the subject invention.

Now referring to FIG. 3, a system 300 that facilitates analyzing members within a multi-dimensional structure that are subject to change and outputting a consistent result with respect to such members is illustrated. The system 300 includes an interface component 302 that receives statements in a declarative language relating to a member within a multi-dimensional structure 304, wherein such structure 304 resides within a data store 306. In particular, members within modifiable dimensions can be subject to alteration, addition of members, and deletion of members. In conventional systems, such alteration of members causes inconsistent and confusing results to be returned to a user. For example, at a first point in time a user can request that cities with a particular population number be returned, and several of such cities can exist. At a second point in time, however, there may be no cities that are associated with the specified population—however, consistent output should be provided to the user even with changing circumstances.

An execution engine 308 can receive the statements provided to the interface component 302, and execute such statements against the multi-dimensional structure 304. The execution engine 308 can be associated with a member analyzer 310 that analyzes members identified and/or requested within the statements and identified by the execution engine 308. An output component 312 can then output a result to a member as a function of the analysis. For instance, if the member analyzer 310 determines that a member associated with the received statements cannot be resolved, the output component 312 can cause an error to be generated and provided to a user. In a different example, if the member analyzer 310 determines that a member associated with the received statements cannot be resolved, the output component can replace such member with a null member and provide the null member instead of an error to a user. A manner in which members that cannot be resolved can be user-selectable, wherein such user can make the aforementioned specification for each dimension (if desired) within the multi-dimensional structure 304. The output component 312 can be communicatively coupled to a presentation component 314 that displays results associated with the statements to a user. While illustrated in FIG. 3 as communicating to the presentation component 314 by way of the interface component 302, it is to be understood that the output component 312 can be directly coupled to the presentation component 314.

Figure 4:
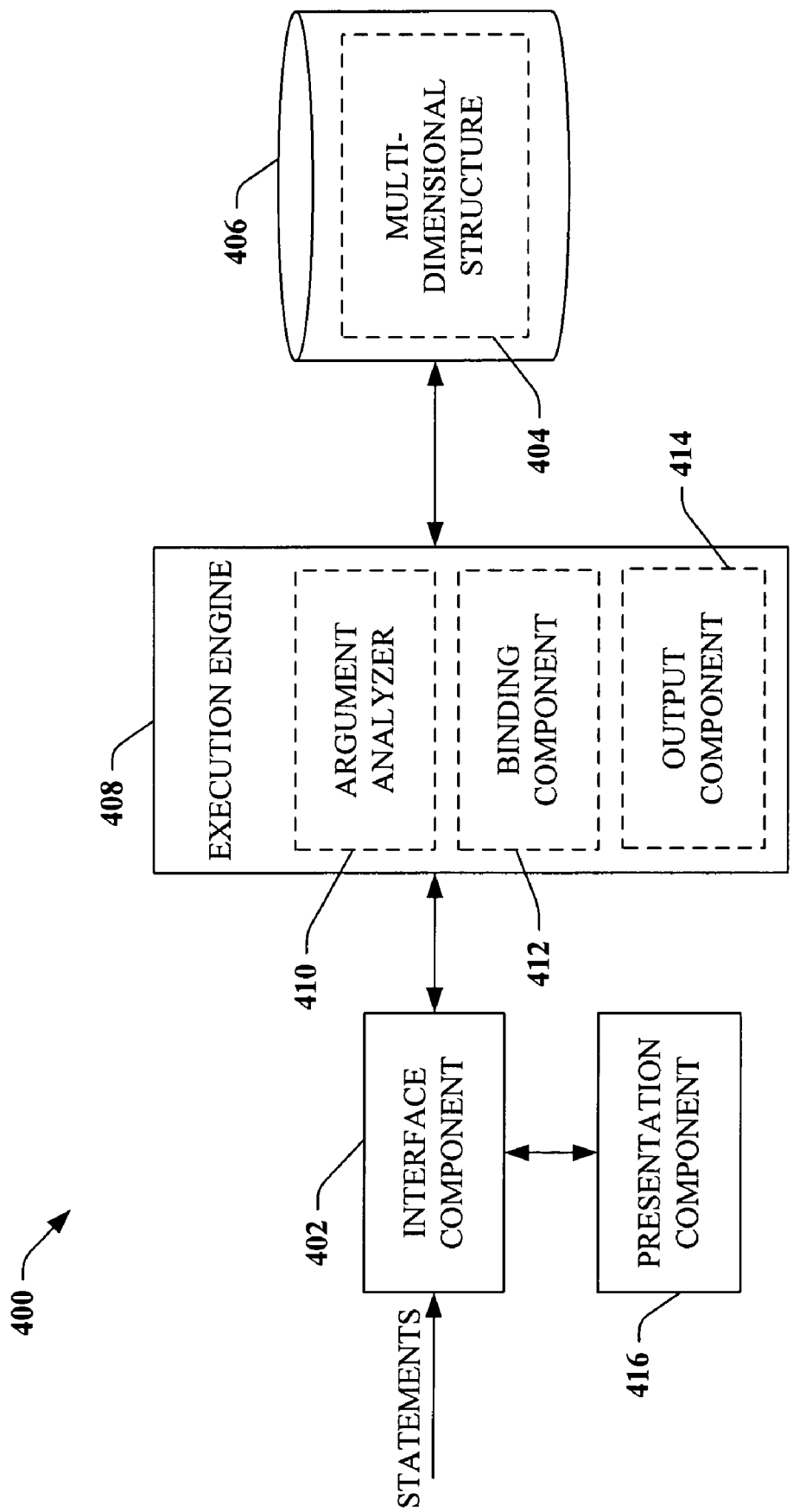
FIG. 4 is a block diagram of a system that facilitates resolving arguments within a statement relating to a multi-dimensional structure at execution time in accordance with an aspect of the subject invention.

Turning now to FIG. 4, a system 400 that can be utilized to enhance usability of a declarative language employed in connection with querying and/or updating a multi-dimensional structure is illustrated. The system 400 includes an interface component 402 that receives statements in a declarative language, such as an SQL-based language (e.g., MDX). The interface component 402 can be, for example, a keyboard, a GUI, a pointing and clicking mechanism, a pressure-sensitive screen, a microphone, voice recognition hardware/software, any combination thereof, and the like. The statements relate to updating, maintaining, and/or querying a multi-dimensional structure 404 that exists within a data store 406. The multi-dimensional structure 404 can be, for instance, a data cube, a dimension relating to a data cube, a set associated with a data cube, an attribute hierarchy, a user-created hierarchy, an attribute, and the like.

The statements can be relayed to an execution engine 408 that can exist on a server with the multi-dimensional structure 404. The execution engine 408 is employed to execute the statements against the multi-dimensional structure 404, and can be associated with an argument analyzer 410 that analyzes arguments within the received statements. For instance, the statements can comprise a function and an argument, wherein the argument includes expressions that are associated with a particular object type. In a particular example, conventional systems utilize a function that provides for return of data if and only if a specific condition is true. In conventional systems/methods, two variations of this function are required for disparate object types within an argument:

iif(<logical expression>), <string expression1>, <string expression2>), and iif(<logical expression>), <numeric expression1>, <numeric expression2>).

These two disparate variations are necessary in conventional systems as binding occurs at a time of parsing the arguments rather than at execution time. The system 400 includes a binding component 412 that, based upon the analysis provided by the argument analyzer 410, binds the arguments at execution time. Due to such late binding, there need not be as many functions as permutations of types each argument can possess. In addition, the execution engine 408, by way of the argument analyzer and the binding component 412, enables a function to include mixed-type expressions. For instance, a function such as the "iff" function can be simplified to the following:

iff(<logical expression>, <expression1>, <expression2>).

Accordingly, there need not be a specified object type within the expression, and expressions with mixed types can be employed in connection with the system 400.

Upon binding the arguments at runtime and obtaining an appropriate result, an output component 414 can be utilized to return results to a user. For instance, the output component 414 can arrange data in a manner that is desirable to a user. A presentation component 416, such as a GUI, speakers, or the like can then be employed to present the output created by the output component 414 to the user.

Figure 5:
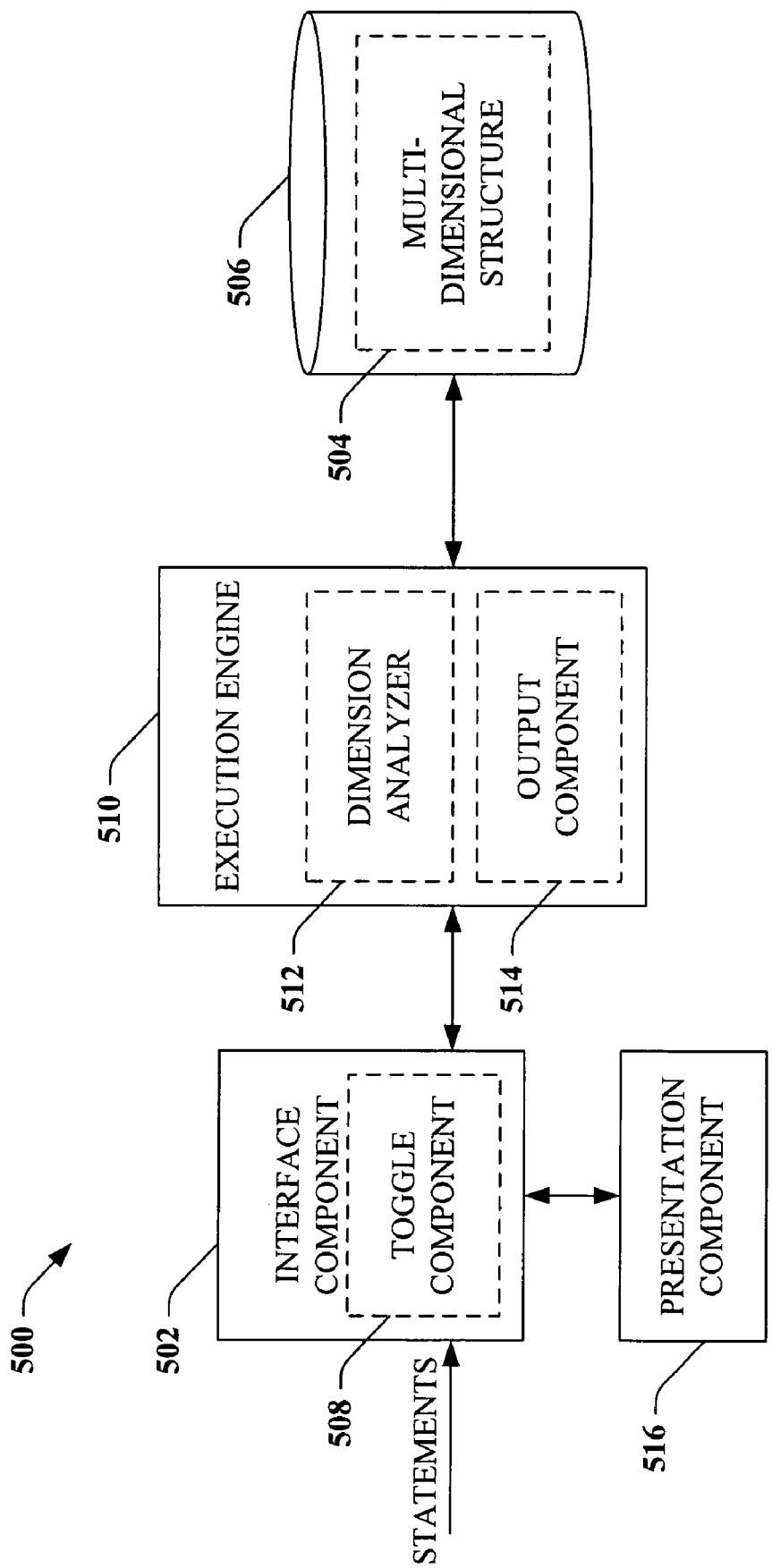
FIG. 5 is a block diagram of a system that facilitates analyzing and managing data with respect to unrelated dimensions of a multi-dimensional structure in accordance with an aspect of the subject invention.

Now referring to FIG. 5, a system 500 that facilitates determining a manner in which data associated with unrelated dimensions is provided to a user is illustrated. The system 500 includes an interface component 502 that receives statements from a user relating to querying, updating, and/or maintaining a multi-dimensional structure 504 within a data store 506. The interface component 502 includes a toggle component 508 that allows a user to specify how data associated with unrelated dimensions is to be returned to a user. For instance, while it is reasonable to analyze sales by customer, it is unreasonable to analyze inventory by customer, because inventory and a particular customer are substantially unrelated. The toggle component 508, for example, can be utilized to ignore unrelated dimension and return a value of a selected dimension. For instance, rather than providing an error if inventory by customer is requested, the toggle component 508 can cause return of a value associated with inventory without relating the customer thereto. In another possible utilization of the toggle component 508, a user can select that null values are to be returned if data relating to two or more unrelated dimensions are requested. For instance, rather than returning any value for inventory by customer or an error, a null value can be returned to the user. In yet another example, a user can desire to receive errors upon requesting data with respect to unrelated dimensions. The toggle component 508 allows the user to customize a manner in which data associated with unrelated dimensions is handled.

The interface component 502 can relay received statements to an execution engine 510, which can execute such statements against the multi-dimensional structure 504. For instance, the execution engine 510 can be an OLAP engine, wherein such engines are known to resolve queries in a much more efficient and expeditious manner than conventional relational engines. The execution engine 510 can include a dimension analyzer 512 that analyzes relation of dimensions within the multi-dimensional structure 504. For instance, a dimension can be associated with metadata that indicates whether such dimension is sufficiently related to a disparate dimension. Similarly, structure of objects within differing dimensions can be indicative of whether such differing dimensions are related. Thus, any suitable manner of indicating and determining whether disparate dimensions are related to one another is contemplated and can be undertaken by the dimension analyzer 512. If the dimension analyzer 512 determines that data is requested with respect to two or more unrelated dimensions, an output component 514 can be employed to output data in accordance with a selected output manner made by way of the toggle component 508 (e.g., an error can be generated, a null value can be returned, or one or more unrelated dimensions can be ignored). The output created by the output component 514 can thereafter be returned to a user by way of a presentation component 516.

Figure 6:
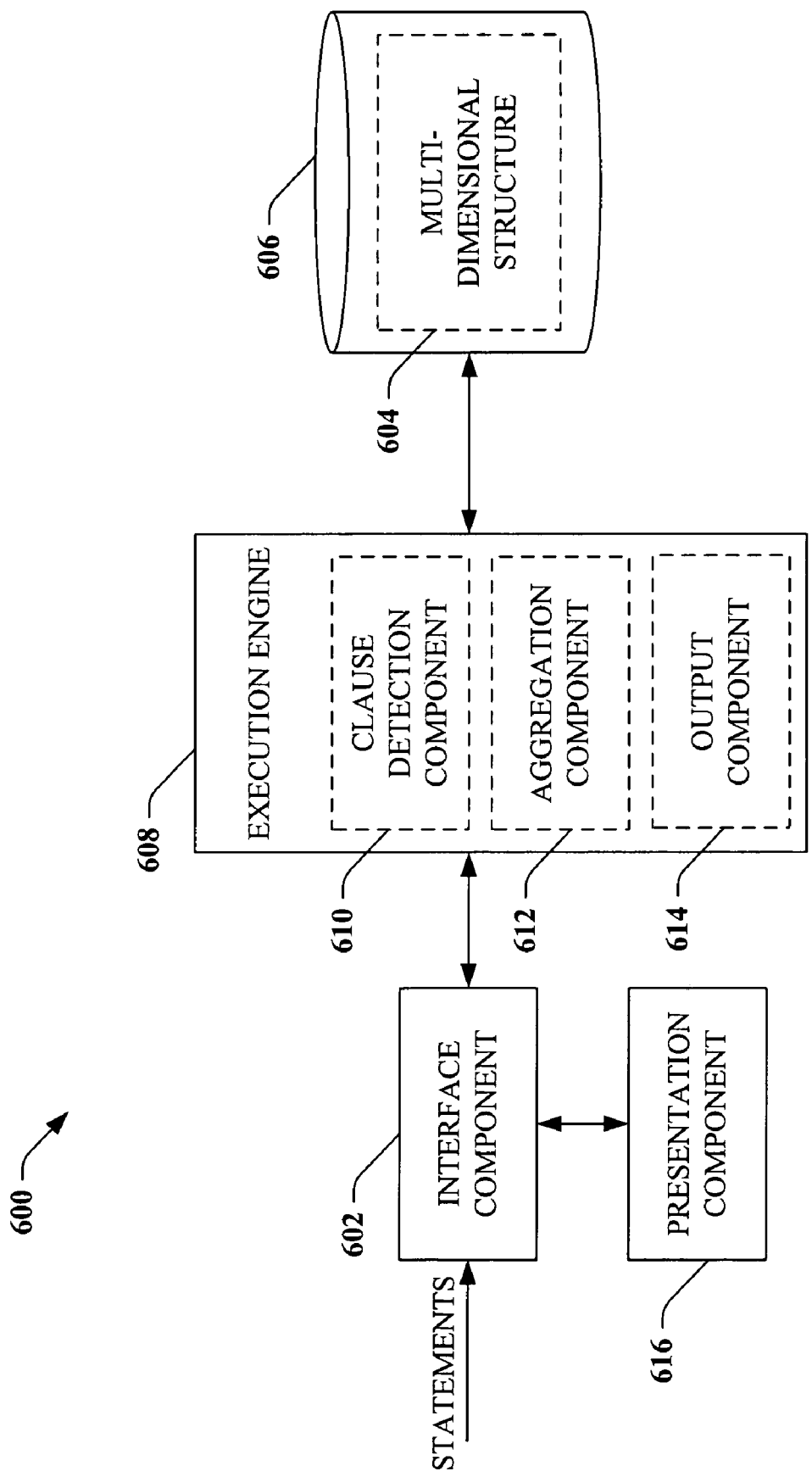
FIG. 6 is a block diagram of a system that facilitates aggregating data associated with multiple sets in accordance with an aspect of the subject invention.

Now turning to FIG. 6, a system 600 that facilitates return of data aggregated over one or more sets is illustrated. A set is a collection of values in no particular order, and can be obtained from any suitable data structure. A set can include values, calculations, and the like. An interface component 602 receives statements relating to retrieving data from and/or updating data within a multi-dimensional structure 604 within a data store 606. The statements can include explicit reference to a plurality of sets within the multi-dimensional structure 604, wherein data within the sets is desirably aggregated. An execution engine 608 receives the statements and is utilized to execute the statements against the multi-dimensional structure.

The execution engine 608 is associated with a clause detection component 610 that detects clauses within the statement specifying the aforementioned plurality of sets. In one particular example, the clause can be a "where" clause within a declarative language such as MDX. Specifically, the clause can relate to selecting items where two sets are satisfied:

Select<data>where (<set 1, set 2>).

The clause detection component 610 can detect existence of the "where" clause (or other clause utilized for similar purposes), and data can be aggregated over the first set and the second set, and results of such aggregation can be returned to a user. An aggregation component 612 can be employed to aggregate data over the sets located by way of the clause detection component 610.

The aggregation component 612 can perform the requested data aggregations according to various rules. For instance, with respect to sets that result in arbitrarily shaped subcubes, an aggregation can be made over such subcubes containing a set with cells not included in the clause replaced with null values. Therefore, data can be aggregated over arbitrarily shaped subcubes without causing an error to be returned to a user. In another example, if sets relate to disparate levels in differing hierarchies, such sets can be moved into a substantially similar level of such hierarchies to enable output of a consistent result. When such sets are desirably aggregated, several different manners of aggregating the data exists, and all such aggregations are contemplated by the inventors of the subject invention and intended to fall under the scope of the hereto-appended claims. In yet another example, where calculations are related to a set desirably aggregated, such calculations can be aggregated over the set. In particular, overlapping attributes in the calculation can overwrite members in the set within the clause found by the clause detection component 610. Upon data being aggregated according to the received statements, an output component 614 facilitates arranging and formatting values in a user-friendly manner.

The output component 614 can relay the output values to a presentation component 616 (directly or indirectly). The presentation component 616 can then present the output to the user.

Figure 7:
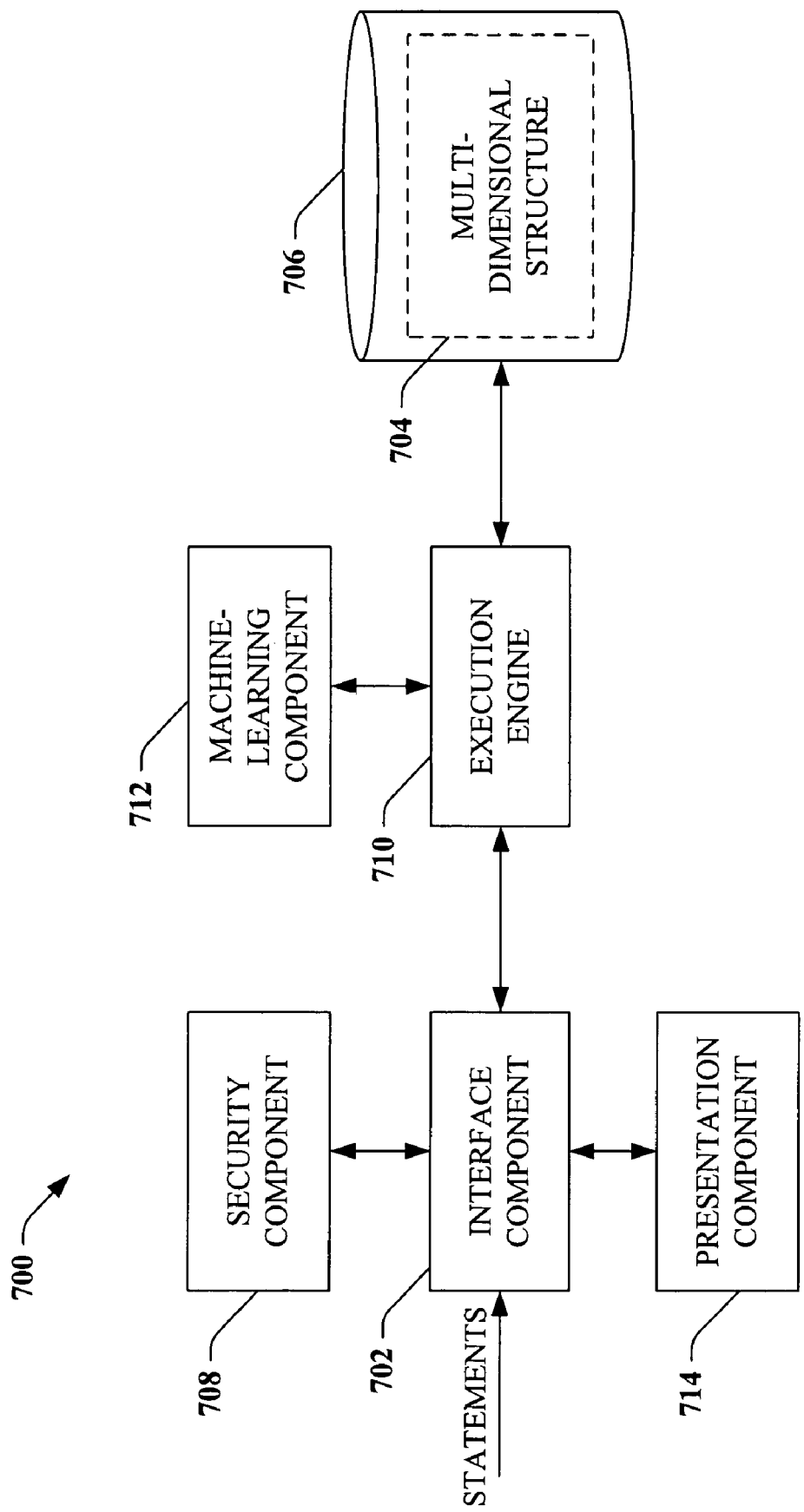
FIG. 7 is a block diagram of a system that facilitates determining authorization levels of a user with respect to a multi-dimensional structure in accordance with an aspect of the subject invention.

Turning now to FIG. 7, a system 700 that facilitates securing a multi-dimensional structure from utilization by unauthorized individuals/entities is illustrated. The system 700 includes an interface component 702 that receives statements that effect structure and/or content of a multi-dimensional structure 704 within a data store 706. The interface component 702 is associated with a security component 708 that ensures that a user is authorized to effectuate a calculation, assignment, script, or the like against the multi-dimensional structure 704. For instance, the security component 708 can employ conventional techniques, such as username, password, and/or personal identification number (PIN) analysis to determine whether a user is authorized to access and/or modify the multi-dimensional structure 704. In another example, the security component 708 can analyze biometric indicia associated with a user to determine whether the user is authorized to access all or portions of the multi-dimensional structure. Specifically, the security component 708 can be employed to undertake one or more of a fingerprint analysis, voice analysis, retina scan, or any other suitable technique for determining identification of a user through biometric indicia.

The security component 708 can determine and enforce user-access with respect to disparate portions of the multi-dimensional structure 704, as well as enforce disparate security levels with respect to a user and at least a portion of the multi-dimensional structure 704. For instance, for one portion of the multi-dimensional structure 704, a user may have read/write access, while to a disparate portion, the user may have read-only access, and for yet a disparate portion of the multi-dimensional structure 704 the user may be prohibited from reading and/or writing to such portion. Thus, the security component 708 can implement multiple levels of security with respect to disparate users and different portions of the multi-dimensional structure 704.

Upon a user being authorized to access at least a portion of the multi-dimensional structure 704, the interface component 702 accepts statements that update the multi-dimensional structure and relay such statements to an execution engine 710. The execution engine can then execute such statements against the multi-dimensional structure 704. The execution engine can be associated with a machine-learning component 712 that watches utilization of the system 700 over time and learns patterns of use. The machine-learning component 712 can thereafter generate inferences with respect to operability of the system 700.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For example, the execution engine 710 can receive statements relating to aggregating data over various sets, wherein there are disparate manners in which to effectuate such aggregation. The machine-learning component 712 can watch the user over time and learn how such desirably receives data with respect to the aggregated sets, and then make inferences regarding how such sets are best aggregated. More particularly, the user, over time, can systematically request data to be aggregated in a certain manner, and therefore the machine-learning component 712 can make inferences that inform the execution engine 710 to aggregate the data in the desired manner. Similarly, if a statement relating to return of data as measured against an unrelated dimension is received, the machine-learning component 712 can determine probabilities associated with a how data is desirably returned to a user, and automatically return data in a particular manner if the probability is above a pre-defined threshold.

The system 700 further includes a presentation component 714 that outputs results of executions undertaken by the execution engine 710 against the multi-dimensional structure 704 to a user. For instance, the presentation component can be a LCD display, a CRT display, a plasma display, or any other suitable display device. Similarly, the presentation component 714 can utilize speakers or other audio generating device to present desired output to the user. Thus, the presentation component 714 can output calculations in any suitable manner that enables such user to quickly comprehend the returned data.

Now referring to FIGS. 8-12, methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 8:
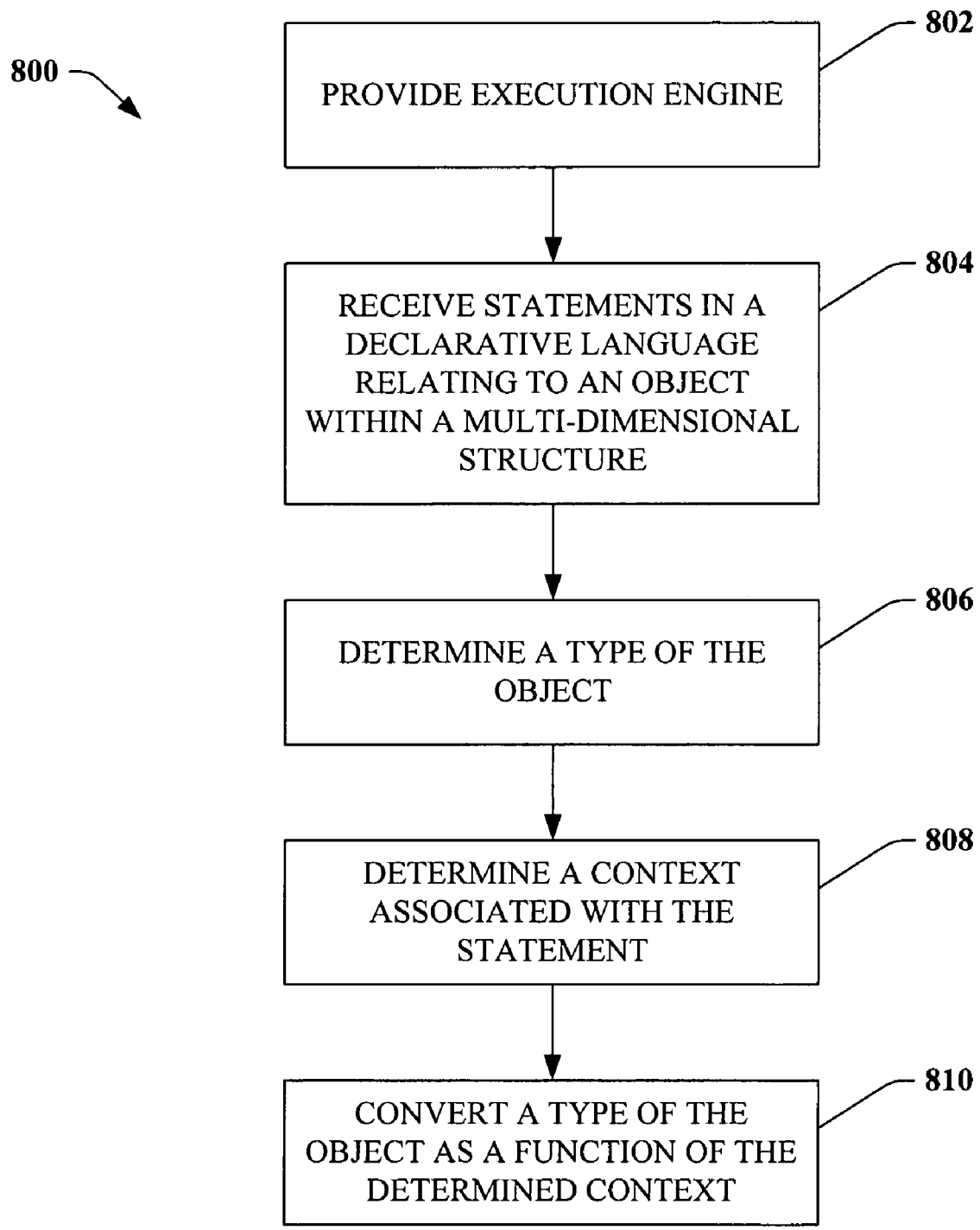
FIG. 8 is a flow diagram illustrating a methodology for implicitly converting a type of an object to a desired type in accordance with an aspect of the subject invention.

Now turning solely to FIG. 8, a methodology that facilitates automatic type conversion of an object depending upon a function and/or context is illustrated. At 802, an execution engine is provided. For instance, the execution engine can be an OLAP engine or any other suitable engine that can be utilized to execute commands against a multi-dimensional structure. At 804, statements in a declarative language are received, wherein such statements relate to an object within a multi-dimensional structure (e.g., a data cube). For example, the statements can include a function that is utilized to operate on a particular object type and/or return a particular object type. At 806, a type of the object associated with the received statements is determined. For example, the type can be a hierarchy, a level of a hierarchy, a set, a member, a scalar, a tuple, and the like. Any suitable object type within a multi-dimensional structure can be determined in connection with undertaking the methodology 800.

At 808, a context associated with the received statements is determined. For example, if the declarative language is MDX, and the statements include a "Head" function, then it can be implicitly determined that a set is desirably returned to a user. In another example, a particular intermediary result can influence an object type desirably operated upon and/or returned to a user. At 810, a type of the object is implicitly converted as a function of the determined context. Continuing with the above example, if a "Head" function is received and it is enacted against a hierarchy, the hierarchy can be implicitly converted to a set and returned to the user.

Figure 9:
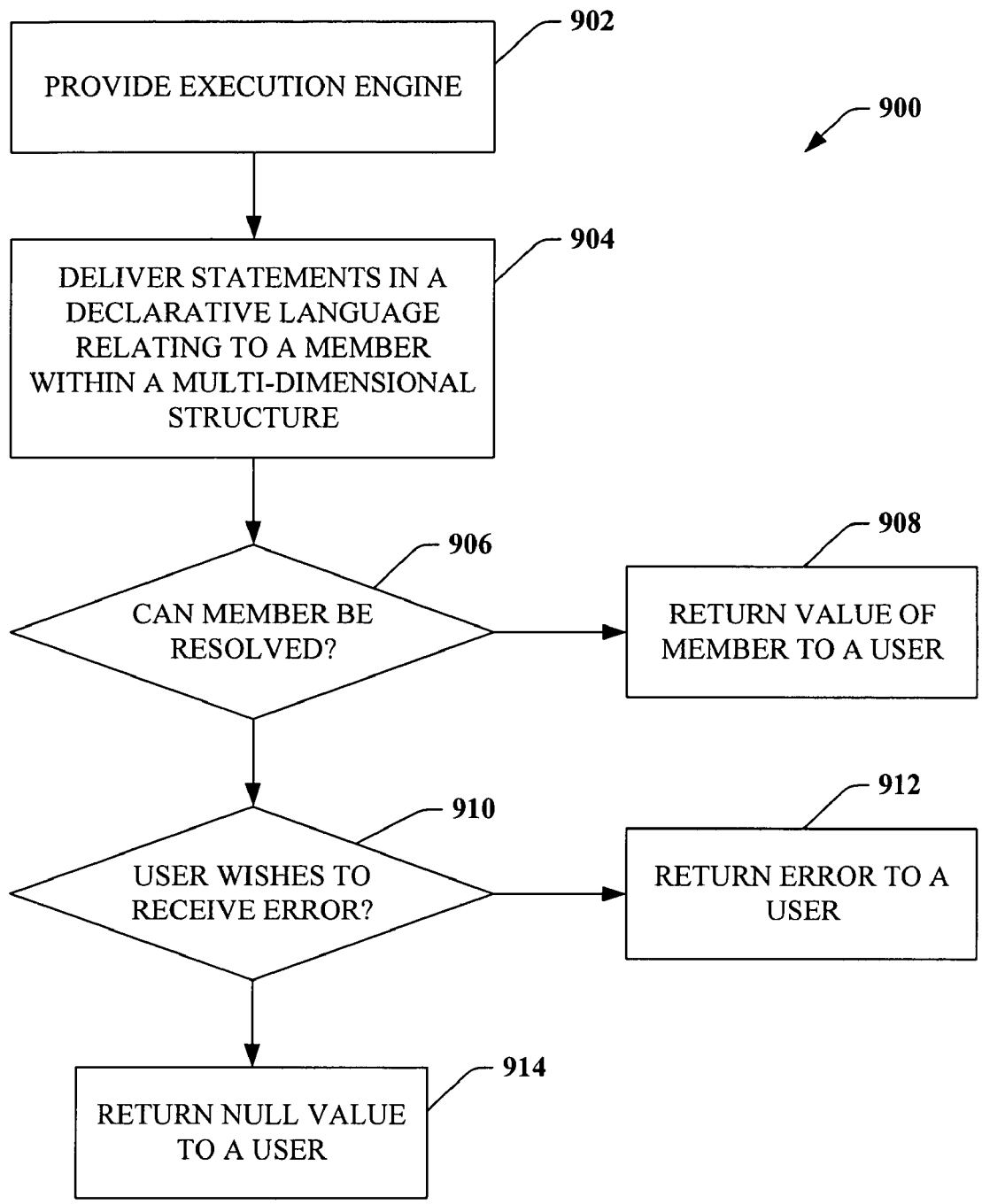
FIG. 9 is a flow diagram illustrating a methodology for analyzing and managing a member within a multi-dimensional structure that is subject to change in accordance with an aspect of the subject invention.

Now referring to FIG. 9, a methodology 900 that enables a user to customize a manner data is returned with respect to alterable members is illustrated. For instance, a user may not wish to receive an error when a member cannot be resolved, but would rather receive a null value. At 902, an execution engine is provided that can execute statements in a declarative language against a multi-dimensional structure. At 904, statements in a declarative language (e.g., MDX) are delivered to the execution engine, wherein such statements relate to a member within a multi-dimensional structure (e.g., a data cube). At 906, a determination is made regarding whether the member can be resolved. For instance, altering circumstances in data can cause a requested member to be non-resolvable. If the member can be resolved, a value of the member is returned to a user at 908.

If the member cannot be resolved, then a determination is made at 910 regarding a manner in which to proceed. In particular, a determination is made regarding whether the user wishes to receive an error if the member cannot be resolved. The user can specify this prior to delivering the statement through a toggle component (described with respect to FIG. 5), and such specification can be made per individual member, per members within a hierarchy, or any other level of granularity. If the user desires that an error be returned if the member cannot be resolved, then such error is returned to the user at 912. If the user does not wish to receive an error if the member cannot be resolved, then a null value can be returned to the user at 914.

Figure 10:
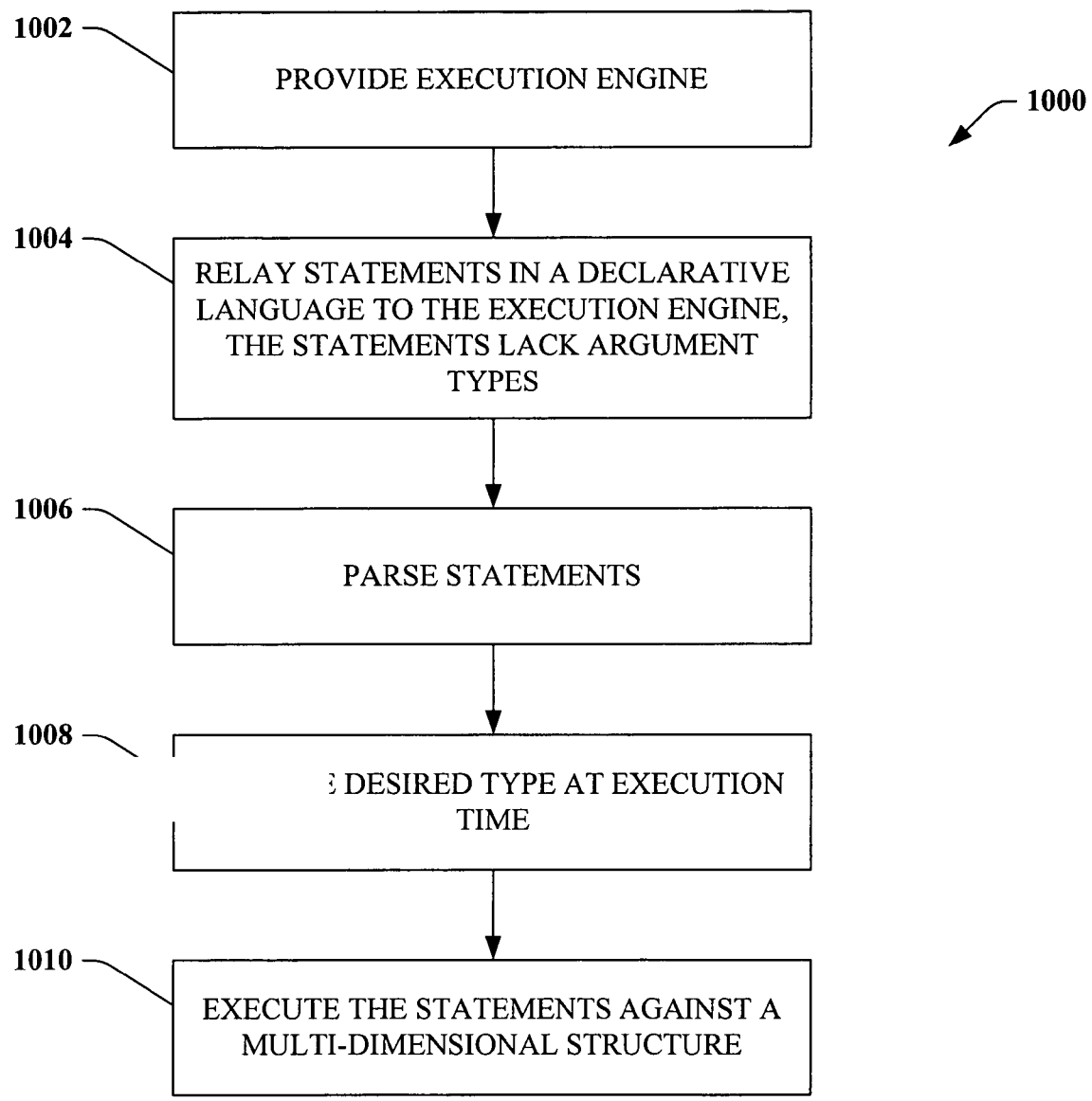
FIG. 10 is a flow diagram illustrating a methodology for resolving arguments within a statement relating to a multi-dimensional structure at execution time in accordance with an aspect of the subject invention.

Now referring to FIG. 10, a methodology 1000 that facilitates updating a multi-dimensional structure by way of receipt of declarative statements is illustrated. At 1002, an execution engine is provided, and at 1004 statements in a declarative language are relayed to the execution engine, wherein such statements lack argument types. Specifically, conventional systems, for example, require a user to specify a type within an argument of a function (e.g., whether a numerical expression is desirably returned, a string, . . . ). Utilizing the methodology 1000, however, the type does not need to be specified. At 1006, the received statements are parsed and analyzed, and at 1008 the statements (and arguments therein) are resolved and bound at execution time (rather than at parsing time). Resolving the arguments at execution time allows a number of previously required functions to decrease, as the number of functions does not need to be equal to number of permutations of types within arguments each function can possess. At 1010, the statements are executed against the multi-dimensional structure, thereby causing a desired modification of content of the structure and/or return of desired data.

Figure 11:
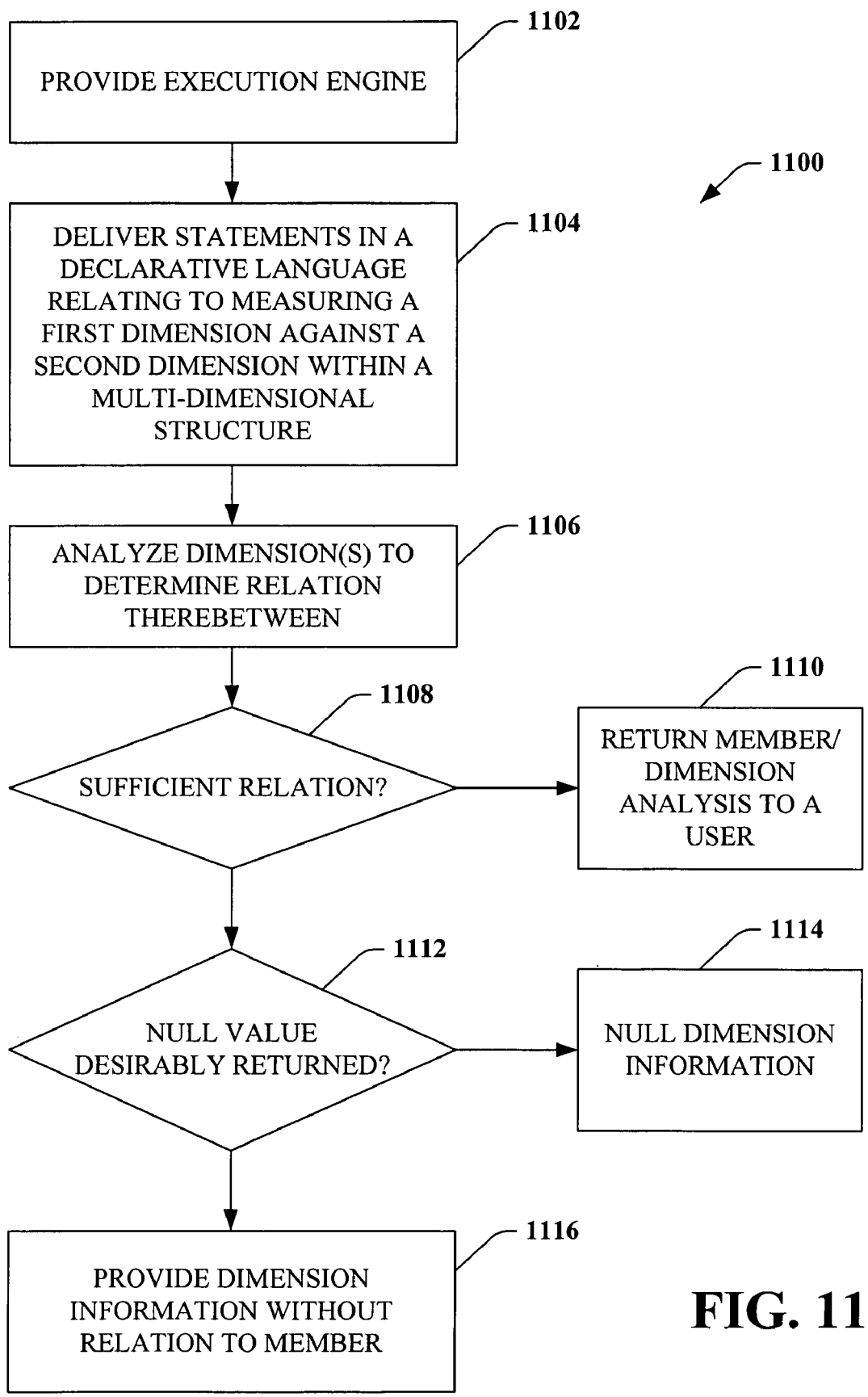
FIG. 11 is a flow diagram illustrating a methodology for analyzing and managing dimensions within a multi-dimensional structure that are not substantially related in accordance with an aspect of the subject invention.

Turning now to FIG. 11, a methodology that enables queries requesting relation of unrelated dimensions to be resolved in a consistent and customized manner is illustrated. At 1102, an execution engine is provided, and at 1104 statements in a declarative language relating measuring a first dimension against a second dimension within such structure are received. At 1106, the dimension(s) are analyzed to determine a level of relation therebetween. For instance, metadata can be associated with the dimensions, wherein such metadata provides an indication of whether the dimensions are sufficiently related. Any suitable means for indicating whether two dimensions are related, however, can be utilized in connection with the methodology 1100.

At 1108, a determination is made regarding whether there is a sufficient relation between the two dimensions. If there is a sufficient relation, then a value associated with such relation can be returned to a user at 1110 (e.g., sales by customer, sales over time, . . . ). If there is not sufficient relation between dimensions, then a determination is made at 1112 regarding whether the user wishes to receive null values with respect to the unrelated dimensions. If the user does wish to receive null values, then at 1114 values associated with the unrelated dimension are nulled. If the user does not wish to set these values to null values, then at 1116 dimension information is returned without relation to the other dimension. As an example, if the user requests inventory measured against customer, then a current value of inventory may be returned (and the customer dimension may be ignored).

Figure 12:
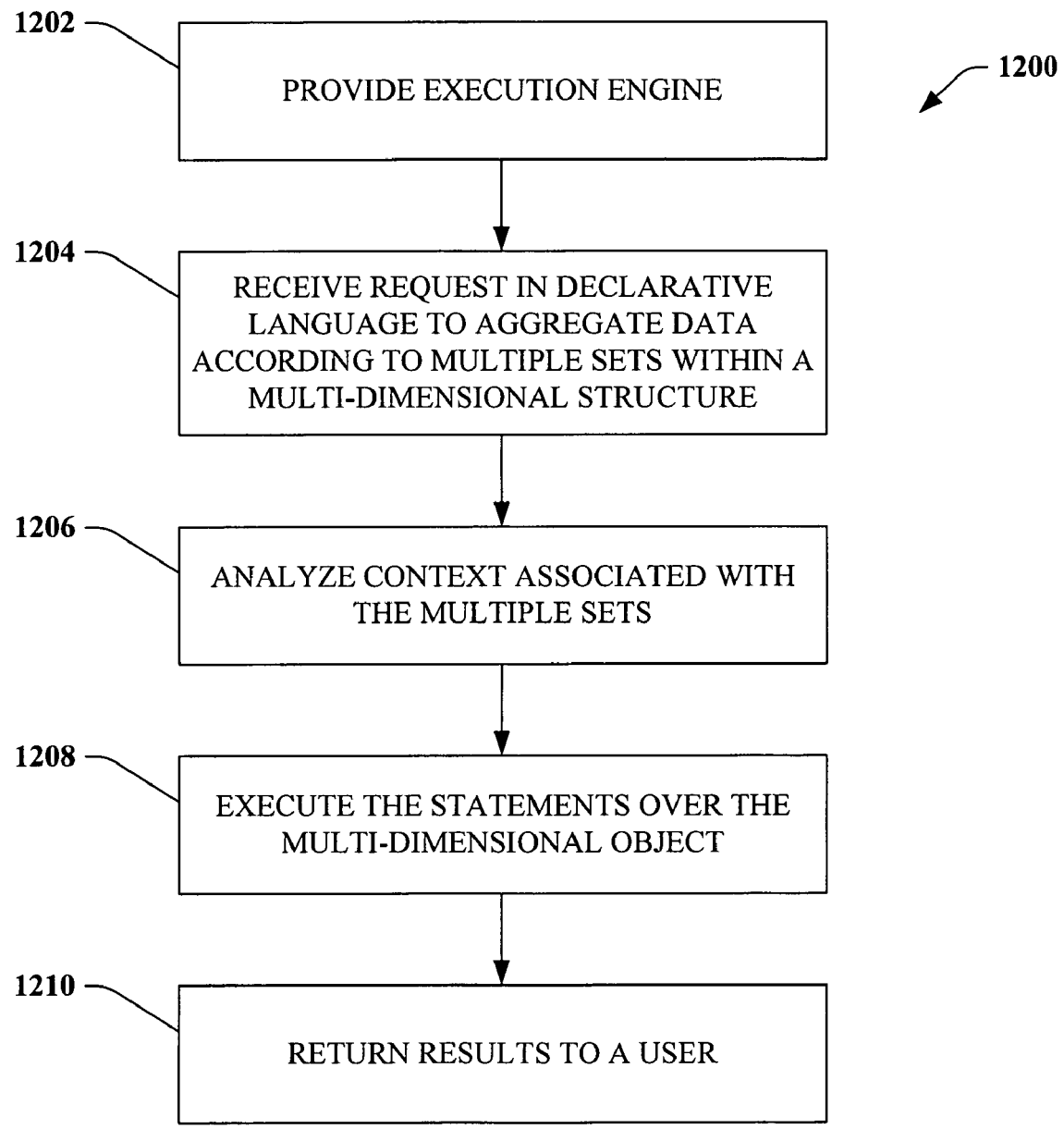
FIG. 12 is a flow diagram illustrating a methodology for specifying sets within a statement and aggregating data and/or calculations associated with the sets in accordance with an aspect of the subject invention.

Now referring to FIG. 12, a methodology 1200 relating to aggregating data with respect to multiple specified sets is illustrated. At 1202, an execution engine that can execute declarative statements against a multi-dimensional structure is provided. At 1204, requests in a declarative language are received, wherein such requests relate to or cause data to be aggregated with respect to multiple sets in a multi-dimensional structure. For example, in MDX a "where" clause can include a plurality of sets in which data is to be aggregated. At 1206, a context associated with the multiple sets can be analyzed. For instance, the requested aggregation can include aggregation of calculations within the set. Accordingly, disparate rules can be defined with respect to various (and complex) aggregations. At 1208, the received statements are executed against the multi-dimensional object, and at 1210 results associated with the aggregation are returned to a user.

Figure 13:
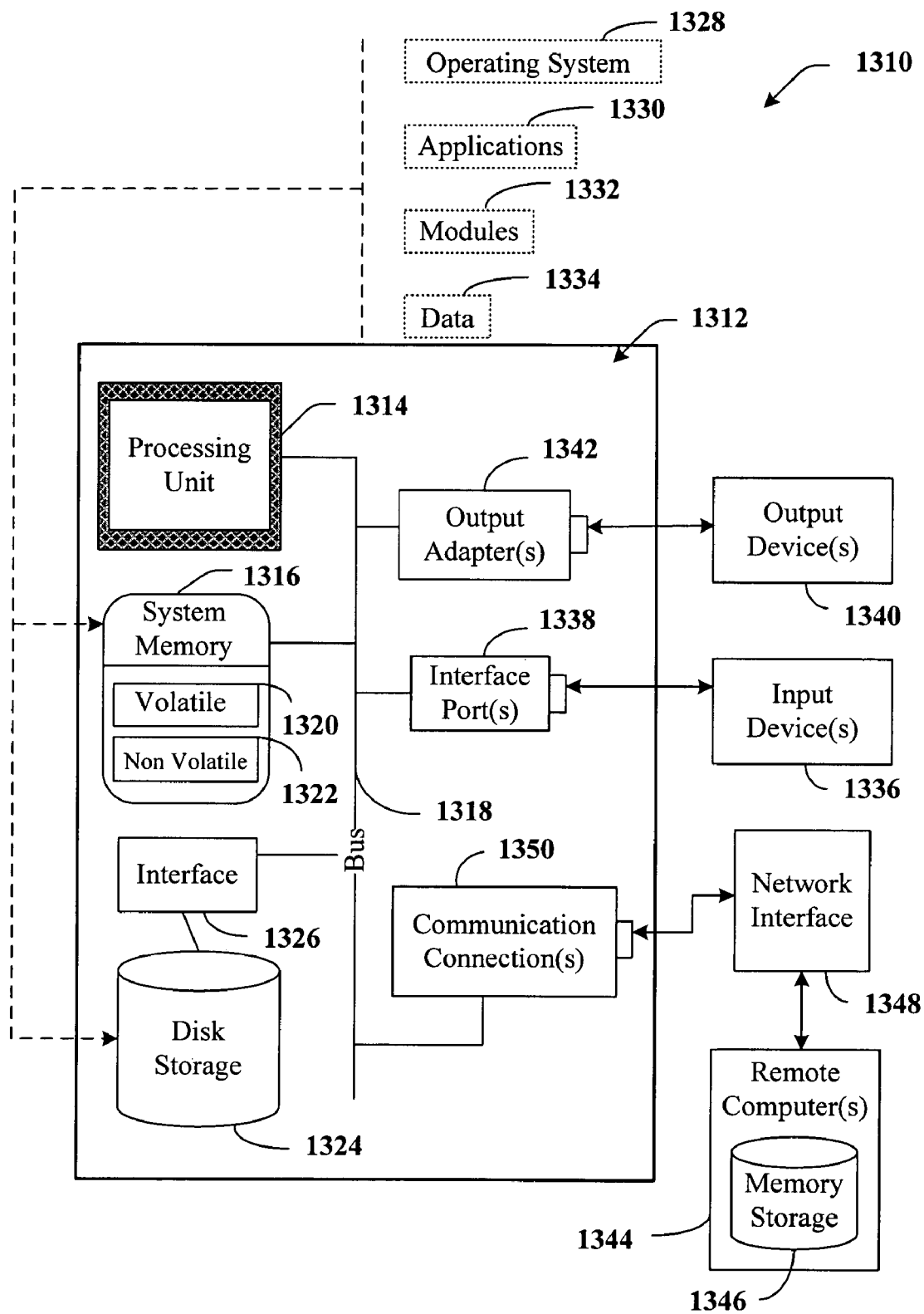
FIG. 13 is an exemplary computing environment that can be utilized in connection with the subject invention.

In order to provide additional context for various aspects of the subject invention, FIG. 13 and the following discussion are intended to provide a brief, general description of a suitable operating environment 1310 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1310 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/nonremovable, volatile/nonvolatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
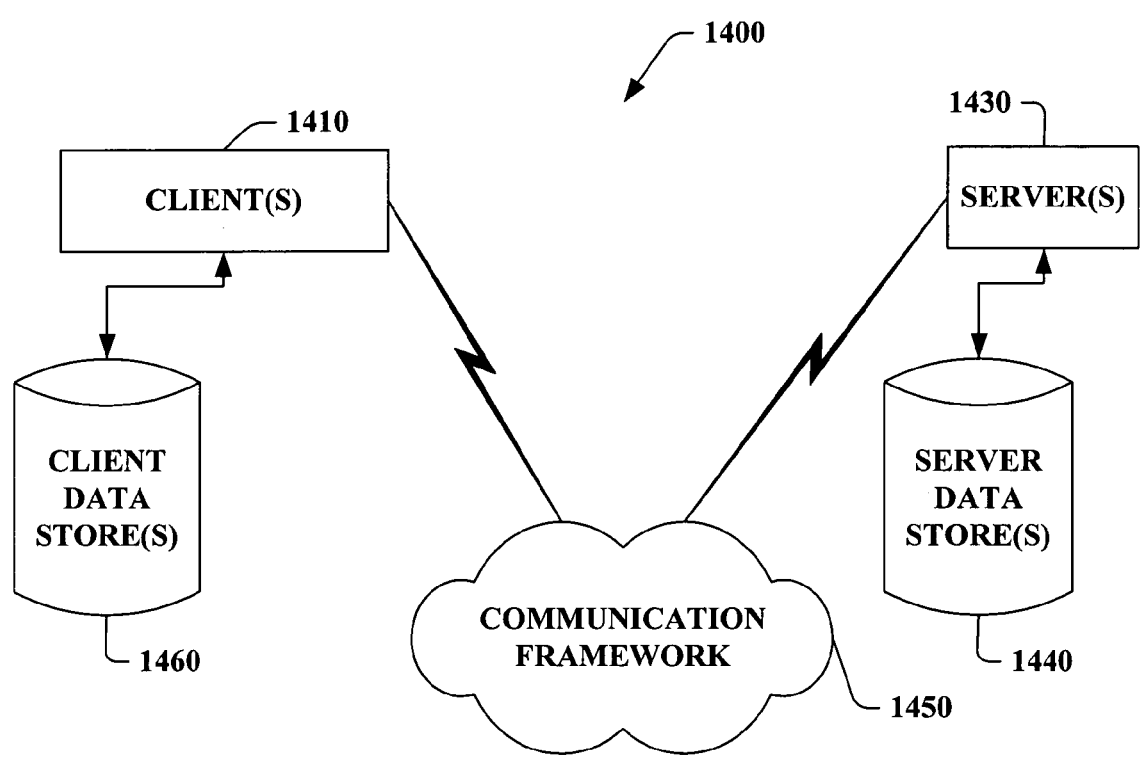
FIG. 14 is an exemplary operating environment that can be employed in connection with the subject invention.

FIG. 14 is a schematic block diagram of a sample-computing environment 1400 with which the subject invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the subject invention, for example. One possible communication between a client 1410 and a server 1430 can be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied in a computer-readable storage medium, that facilitates one or more of querying and updating a multidimensional structure, the system comprising:

an interface component that receives a first statement in a declarative language relating to a typed object associated with the multi-dimensional structure, the interface component including a toggle component configured to receive, via a user interface, a plurality of user inputs, wherein said plurality of user inputs specifying how the toggle component is to return data in response to received statements querying data from unrelated dimensions of the multidimensional structure, the plurality of user inputs including:

first user input indicating that, in response to the received statements querying data from unrelated dimensions of the multidimensional structure, the toggle component is to return a value of a selected unrelated dimension without any of the other unrelated dimensions;

second user input indicating that, in response to the received statements querying data from unrelated dimensions of the multidimensional structure, the toggle component is to return a null value; and third user input indicating that, in response to the received statements querying data from unrelated dimensions of the multidimensional structure, the toggle component is to return an error;

a context recognition component that analyzes the first statement and determines a desired output that is associated with the first statement, wherein the context recognition component reviews pre-defined rules associated with the object type to determine a type conversion to be undertaken;

a conversion component automatically converts the object to a disparate type as a function of the analysis in response to receipt of the first statement;

a member analyzer that determines whether a member associated with the received first statement is consistently resolvable, wherein the member analyzer has a plurality of user-selectable configurations are selectable via a user interface, wherein when the member analyzer is in a first of the plurality of user-selectable configurations and the member associated with the received first statement cannot be resolved consistently, the member analyzer outputs a null member, wherein when the member analyzer is in a second of the plurality of user-selectable configurations and the member associated with the received first statement is unresolved consistently, the member analyzer outputs an error; and a binding component that resolves an argument within the first statement at execution time.

2. The system of claim 1, an execution engine comprises the conversion component.

3. The system of claim 2, the execution engine is an Online Analytical Processing (OLAP) engine.

4. The system of claim 1, the declarative language is a Structured Query Language (SQL)-based language.

5. The system of claim 4, the declarative language is Multidimensional Extensions (MDX).

6. The system of claim 1, the multi-dimensional structure is one or more of a data cube, a dimension relating to a data cube, an attribute hierarchy, and an attribute.

7. The system of claim 1, the typed object is one of a hierarchy, a level, a set, a member, a scalar, and a tuple.

8. The system of claim 1, the typed object is converted to one of a hierarchy, a level, a set, a member, a scalar, and a tuple.

9. The system of claim 1, further comprising an interface component that initially receives the statement from one of a user and a computer component, the interface component comprises one or more of a microphone, a display, a keyboard, a pointing mechanism, and a pressure sensitive screen.

10. The system of claim 1, further comprising a presentation component that presents output relating to the received statement to a user.

11. The system of claim 1, further comprising an aggregation component that automatically aggregates data with respect to multiple sets specified in the received statement.

12. At computer system including a processor and system memory, a method that facilitates one or more of querying and updating a multidimensional structure, the method comprising:

receiving, at a user interface, a first statement in a declarative language relating to a typed object associated with the multi-dimensional structure, the first statement including a plurality of user inputs specifying how to return data in response to received statements querying data from unrelated dimensions of the multidimensional structure, the plurality of user inputs including:

first user input indicating that, in response to received statements querying data from unrelated dimensions of the multidimensional structure, a toggle component is to return a value of a selected unrelated dimension without any of the other unrelated dimensions;

second user input indicating that, in response to the received statements data from unrelated dimensions of the multidimensional structure, the toggle component is to return a null value; and third user input indicating that, in response to the received statements querying data from unrelated dimensions of the multidimensional structure, the toggle component is to return an error;

analyzing the first statement and determining a desired output that is associated with the first statement, wherein the analysis includes reviewing pre-defined rules associated with the object type to determine a type conversion to be undertaken;

the processor convening the object to a disparate type as a function of the analysis in response to receipt of the first statement;

determining whether a member associated with the received first statement is consistently resolvable based on a user-selectable configuration selected via the user interface, wherein the user-selectable configuration is selected from among a plurality of user-selectable configurations available through the user interface, the plurality of user-selectable configurations including at least a first user-selectable configuration and a second user-selectable configuration;

outputting a null member when the first statement is not consistently resolvable based on the determination and the user-selectable configuration is the first user-selectable configuration;

outputting an error when the first statement is not consistently resolvable based on the determination and the user-selectable configuration is the second user-selectable configuration; and resolving an argument within the first statement at execution time.

13. The method as recited in claim 12, wherein the plurality of user-selectable configurations also includes a third user-selectable configuration and wherein outputting a response to the received first statement, further includes:

outputting the value of the selected unrelated dimension indicated in the first user input when the first statement is consistently resolvable based on the determination and the user-selectable configuration is the third user-selectable configuration.

14. A computer program product for use at computer system, the computer program product for implementing a method that facilitates one or more of querying and updating a multidimensional structure, the computer program product comprising one or more computer storage media having stored thereon computer-executable instructions that, when executed at a processor cause the computer system to perform the method, including the following:

receive, at a user interface, a first statement in a declarative language relating to a typed object associated with the multi-dimensional structure, the first statement including a plurality of user inputs specifying how to return data in response to received statements querying data from unrelated dimensions of the multidimensional structure, the plurality of user inputs including:

first user input indicating that, in response to received statements querying data from unrelated dimensions of the multidimensional structure, a toggle component is to return a value of a selected unrelated dimension without any of the other unrelated dimensions;

second user input indicating that, in response to the received statements querying data from unrelated dimensions of the multidimensional structure, the toggle component is to return a null value; and third user input indicating that, in response to the received statements querying data from unrelated dimensions of the multidimensional structure, the toggle component is to return an error;

analyze the first statement and determining a desired output that is associated with the first statement, wherein the analysis includes reviewing pre-defined rules associated with the object type to determine a type conversion to be undertaken;

convert the object to a disparate type as a function of the analysis in response to receipt of the first statement;

determine whether a member associated with the received first statement is consistently resolvable based on a user-selectable configuration selected via the user interface, wherein the user-selectable configuration is selected from among a plurality of user-selectable configurations available through the user interface, the plurality of user-selectable configurations including at least a first user-selectable configuration and a second user-selectable configuration;

outputting a null member when the first statement is not consistently resolvable based on the determination and the user-selectable configuration is the first user-selectable configuration;

outputting an error when the first statement is not consistently resolvable based on the determination and the user-selectable configuration is the second user-selectable configuration; and resolve an argument within the first statement at execution time.

15. The computer program product as recited in claim 14, wherein the plurality of user-selectable configurations also includes a third user-selectable configuration and wherein computer-executable instructions that, when executed, output a response to the received first statement, further includes:

outputting the value of the selected unrelated dimension indicated in the first user input when the first statement is consistently resolvable based on the determination and the user-selectable configuration is the third user-selectable configuration.

* * * * *